United States Patent [19]

Mehansho et al.

[11] Patent Number: 5,002,779
[45] Date of Patent: Mar. 26, 1991

[54] DRY STABLE CHOCOLATE BEVERAGE CONTAINING IRON AND VITAMIN C

[75] Inventors: Haile Mehansho, Fairfield, Ohio; Maria E. Z. Saldierna, Echegaray, Mexico

[73] Assignee: The Procter & Gamble Company, Cincinnati, Ohio

[21] Appl. No.: 431,181

[22] Filed: Nov. 7, 1989

[51] Int. Cl.5 .............................................. A23L 1/304
[52] U.S. Cl. ...................................... 426/72; 426/74; 426/593
[58] Field of Search ................. 426/74, 593, 591, 590, 426/72

[56] References Cited

U.S. PATENT DOCUMENTS

| | | | |
|---|---|---|---|
| 3,958,017 | 5/1976 | Morse | 426/74 |
| 4,251,550 | 2/1981 | Proctor | 426/74 |
| 4,497,800 | 2/1985 | Larson | 426/74 |
| 4,710,387 | 12/1987 | Uiterwaal | 426/74 |
| 4,786,510 | 11/1988 | Nakel | 426/74 |
| 4,786,518 | 11/1988 | Nakel | 426/74 |
| 4,882,181 | 11/1989 | Giddey | 426/74 |

Primary Examiner—Carolyn Paden
Attorney, Agent, or Firm—Rose Ann Dabek; J. J. Yetter; R. C. Witte

[57] ABSTRACT

The present invention relates to nutritional improvements in vitamin C and iron supplemented chocolate powders or flavored beverage mixes which preferably contain nonfat milk solids. Other vitamins such as vitamin A, B, D or E and encapsulated β-carotene (vitamin A-precursor) can be added to the dry beverage mix. The supplement can contain other minerals, such as calcium, zinc and copper. In particular, methods for fortifying dry beverage mixes with highly bioavailable iron compounds and stable vitamin C without producing undesirable color or flavor in the mix are disclosed.

23 Claims, No Drawings

DRY STABLE CHOCOLATE BEVERAGE CONTAINING IRON AND VITAMIN C

TECHNICAL FIELD

The present invention relates to nutritional improvements in vitamin C and iron supplemented chocolate powders or flavored beverage mixes. In particular, methods for preparing stable iron and vitamin C fortified dry beverage mixes having enhanced iron bioavailability and stable vitamin C without affecting flavor or color of product are disclosed.

BACKGROUND OF THE INVENTION

Vitamin and mineral supplements for human and veterinary use are commonplace. The medical management of certain anemias can be handled rather well by increasing the daily intake of iron Some diets, or heavy physical exercise, may require the intake of considerable quantities of minerals apart from those generally obtained through what otherwise would be considered a balanced diet.

Vitamin supplementation is important primarily for those who have inadequate diets, including growing children. In developing countries where the dietary intake of minerals and vitamins are low in the general population, such a nutritional supplement would have great value.

Commercially available mineral supplements are useful in many circumstances where enhanced mineral uptake is desirable. However, adhering to a regimen which requires separate intake of vitamin and mineral supplements can give suboptimal results simply because the regimen requires a change in the normal habits and practices of the user. It would be more convenient if the vitamins and minerals could be administered conjointly in a convenient and pleasant tasting form which would not require extra attention, planning and implementation by the user.

In addition, some materials interfere with the absorption of iron. The administration of iron and vitamins in a format which enhances absorption of the iron is highly desirable.

There are well-recognized problems associated with adding both vitamins and iron supplements to foods and beverages. The highly bioavailable iron sources (e.g., ferrous sulfate, ferrous gluconate, etc.) which are commonly used to fortify foods tend to discolor foodstuffs, or to be organoleptically unsuitable. Moreover, it is particularly difficult to formulate foods and, especially, beverages, containing fats and these iron sources as these materials tend to interact. The fats are oxidized producing off-flavors. This interaction not only affects the organoleptic and aesthetic properties of the foods and beverages (the iron can turn the food green and the oxidized fats smell like hydrocarbons), but also undesirably affects the nutritional bioavailability of these materials. On the other hand, the inert iron sources (reduced iron, ferric pyrophosphate, etc.) cause little or no organoleptic problems; however, they are poorly absorbed from the gut. The challenge is to fortify foods with highly bioavailable iron sources without adversely affecting the color or taste of the product.

Vitamins tend to decompose over time in beverages. It is well known that orange juice and other citrus beverages lose their vitamin C content over time. This decomposition occurs even in dry foods if the total moisture is too high, about 10%–15%. Vitamin C (ascorbic acid) acts as an anti-oxidant and therefore is itself reduced or changed when added to beverages. Vitamin A and its precursor, $\beta$-carotene, and riboflavin are also subject to degradation over time.

It would be desirable, therefore, to have vitamin C present with iron wherein bioavailability of both the iron and of the vitamin is optimized. It would also be useful to have such supplements which can be used in beverage compositions without undesirably affecting organoleptic or aesthetic properties.

It is an object of the present invention to provide mixed vitamin and iron mineral supplements which fulfill these unmet needs.

It is a further object of this invention to provide dry beverage mixes which are supplemented with vitamin C, and iron which are stable on storage.

It is a further object herein to provide means for enhancing biological uptake of iron, especially from chocolate flavored beverages, which are both palatable and stable.

These and other objects are secured herein, as will be seen from the following disclosure.

BACKGROUND ART

Ascorbic acid is a material which enhances the absorption of iron from foods In particular, orange juice has been recognized as an enhancer to iron absorption for a long time. Orange juice consumed with a typical western type breakfast reportedly increased iron bioavailability by 2.5-fold. In an in vitro system, addition of orange juice to breakfast meals and cooked pinto beans reportedly caused a dramatic increase in iron solubility. According to Rossander, et al, the reduction of iron absorption by tea was alleviated by orange juice. See: Lynch, S. R. Cook, J. D., "Interaction of Vitamin C and Iron", *Annals New York Academy of Sciences*, 32–44 (1980); Rossander, L., Hallberg, L. and Bjorn-Rasmussen, E., "Absorption of Iron from Breakfast Meals," *Am. J. Clin. Nutr.*, 32, 2484–2489 (1979); Carlson, B. L. and Miller, D. D., "Effects of Product Formulation, Processing and Meal Composition on In Vitro Estimated Availability from Cereal Containing Breakfast Meals", *J. Food Sci.*, 48, 1211–1216 (1983); and Kojima, N., Wallace, D. and Bates, W. G., "The Effects of Chemical Agents, Beverages and Spinach on the In Vitro Solubilization of Iron from Cooked Pinto Beans", *Am. J. Clin. Nutr.*, 34, 1392–1401 (1981).

See, also, the nutritional literature: Ting, S. V., "Nutrients and Nutrition of Citrus Fruits" in *Citrus Nutrition and Quality* (edit. Nagy, S. and Attaway, J.) 3–24 (Amer. Chem. Soc., 1980); Gillooly, M., Bothwell, T. M., Torrance, J. D., MacPhail, A. P., Derman, D. P., Bezwoda, W. R., Mills, W. and Charlton, R. W., "The Effects of Organic Acids, Phytates and Polyphenols on the Absorption of Iron from Vegetables", *Br. J. Nutr.*, 49, 331–342 (1983); Hallberg, L. and Rossander, L., "Improvement in Iron Nutrition in Developing Countries: Comparison of Adding Meat, Soy Protein, Ascorbic Acid, Citric Acid and Ferrous Sulfate on Iron Absorption for a Simple Latin American Type of Meal", *Am. J. Clin. Nutr.*, 39, 577–583 (1984).

In addition to the foregoing, various mineral supplements, including iron supplements and calcium supplements, are described in the following references.

Some form of iron sucrate has been administered to children and the effect on hemoglobin reported; see the Russian reference Metrevely, E. G., *PEDIATRIC* (Moscow) 12, 17–19 1977); Chem. Abs. 89:637.

U.S. Pat. No. 4,582,709, to Peters and Derick, Apr. 15, 1986, relates to chewable mineral supplements, and lists, inter alia, various calcium and iron compounds. Vitamin D is listed as an absorption enhancer.

U.S. Pat. No. 4,351,735, to Buddemeyer, et al, Sept. 28, 1982, relates to mineral supplements which contain certain phosphate moieties. Dispersibility of the compositions is said to be enhanced by "hydroxyl sources", e.g., sugars. A synthetic milk containing vitamins is described. (See also U.S. Pat. No. 4,214,996, to Buddemeyer, et al, July 29, 1980, relates generally to the same subject matter as the '735 patent).

The beneficial effect of orange juice on the uptake of iron from dietary sources is described by Carlson and Miller in JOURNAL OF FOOD SCIENCE, 48, 1211 (1983).

U.S. Pat. No. 3,734,742 issued to Morse, et al (May 22, 1973) relates to a canned or bottled aqueous beverage containing at least 80% water, a pH of 2 to 3.4, ascorbic acid and ferrous ion. The sources of the ferrous ion are ferrous sulfate, ferrous fumarate, ferrous citrate and ferrous lactate.

U.S. Pat. No. 3,958,017 issued to Morse, et al (May, 1976) is related to the above patents. This patent relates to vitamin C and natural fruit and vegetable flavored drinks stabilized by the addition of controlled quantities of cysteine without an adverse effect on taste. Metabolically available iron is also stabilized by the cysteine.

Ferrous fumarate is said to be compatible with cocoa and it is used in corn-soya-milk preparations (Clydesdale and Wiemer, Iron Fortification of Foods, Academic Press, (N.Y., 1985) at page 45.

SUMMARY OF THE INVENTION

The vitamin and mineral supplemented storage stable dry beverage mixes herein employ specific iron salts of fumaric acid and succinic acid, i.e., ferrous fumarate and ferrous succinate, or iron-sugar complexes as the iron source. The iron-sugar complexes of the type described more fully hereinafter contain iron, a sugar and counterions selected from malate, citrate, tartrate, ascorbate, or mixtures thereof. The most preferred iron sources are those in which the iron is in the ferrous (+II) state.

The iron-source is preferably selected from ferrous fumarate, ferrous succinate, iron sucrate-malate, iron fructate-malate, iron sucrate-citrate, iron fructatecitrate, iron sucrate-ascorbate, iron fructate-ascorbate, or mixtures thereof The iron is preferably in the ferrous state in the iron-sugar complexes.

The primary vitamin supplement of the dry beverage mix is ascorbic acid (vitamin C). Vitamins A, B, D and E can also be added.

The beverage also contains dry milk solids, preferably, non-fat milk solids and cocoa or chocolate solids and a sweetener. Other flavor additives may be substituted for the chocolate flavor or the cocoa. The dry mix is dissolved in water or milk to make a flavored drink or beverage.

Typical dry beverage compositions according to this invention comprise:

(a) from 0% to about 25% milk solids, preferably nonfat milk solids;

(b) from about 0.05% to about 20% flavor, preferably, cocoa;

(c) a nutritionally supplemental amount of ferrous fumarate, ferrous succinate or iron-sugar complex;

(d) a nutritionally supplemental amount of vitamin C; and (e) from about 0.5% to about 85% sweetener; wherein, said composition containing no more than 5% total water and no more than 5% total fat.

The water level is very important since water plays a role in ferrous interaction with the ingredients. The fat level is important to minimize oxidation reactions.

Either artificial flavors or natural flavors can be used to make dry beverage mixes containing the vitamin C and iron supplement. Other flavors can be substituted for chocolate, e.g. fruit flavors or vanilla.

In the process for preparing these mixes it is essential that the ingredients not be wet with water or water added to the iron and vitamin C mixture All of the ingredients should be mixed dry; i.e., in an anhydrous state.

All ratios, proportions and percentages herein are by weight, unless otherwise specified.

DETAILED DESCRIPTION OF THE INVENTION

The present invention relates to stable vitamin and mineral supplemented dry beverage mixes which are stable when stored up to one year.

As used herein, the term "comprising" means various components can be conjointly employed in the dry beverage mixes of the present invention. Accordingly, the terms "consisting essentially of" and "consisting of" are embodied in the term comprising.

By "nutritional" or "nutritionally-supplemental amount" herein is meant that the vitamin and iron or other mineral sources used in the practice of this invention provide a nourishing amount of said minerals and vitamins. This supplemental amount will comprise at least 10% of the Recommended Daily Allowance (RDA) of the daily intake of iron and vitamin C, and, preferably, at least 25% of the Recommended Daily Allowance (RDA). The RDA for vitamins and minerals is as defined in The United States of America (see Recommended Daily Dietary Allowance-Food and Nutrition Board, National Academy of Sciences-National Research Council). The serving used to calculate the RDA is 25 gm.

The "iron-sugar" complexes preferred for use in the practice of this invention are prepared in the manner described in U.S. Pat. No. 4,786,510 issued to Nakel et al (1988) and U.S. Pat. No. 4,786,518 issued to Nakel et al (1988); the description of the preparation is incorporated herein by reference. Their preparation is described briefly below. (These materials are referred to herein as "complexes", but they may, in fact, exist in solution as complicated, highly-hydrated, protected colloids. However, the term "complex" is used herein for simplicity.)

As used herein, the term "total water" means the total water present in the dry mix which includes the water present in vitamin preparations, minerals, emulsifiers, sugars, cocoa, milk solids and other ingredients.

As used herein, the term "total fat" means the total fat present in the dry mix which includes the fat present in emulsifiers, vitamin preparations, minerals, sweeteners, cocoa, milk solids and other dry ingredients.

As used herein, the terms "beverage or finished beverage" means the drink which is prepared by mixing the dry mix of this invention with a diluent, i.e., water, milk or other aqueous medium, e.g. coffee, tea or fruit juice. The dry mix is diluted at a ratio of 0.8:10 to 1.2:10 of dry mix to diluent or liquid, e.g. water or milk.

As used herein, the term "flavors" includes both fruit and botanical flavors. As used herein, the term "fruit flavor" refers to those flavors derived from the edible reproductive part of a seed plant, especially one having a sweet pulp associated with the seed. Also included within the term "fruit flavor" are synthetically prepared flavors made to simulate fruit flavors derived from natural sources.

The term "botanical flavor" refers to flavors derived from parts of a plant other than the fruit; i.e. derived from bean, nuts, bark, roots and leaves. Also included within the term "botanical flavor" are synthetically prepared flavors made to simulate botanical flavors derived from natural sources. Examples of such flavors include cocoa, chocolate, vanilla, coffee, cola, tea, and the like. Botanical flavors can be derived from natural sources such as essential oils and extracts, or can be synthetically prepared.

As used herein the term "sweeteners" includes sugars, for example, glucose, sucrose, and fructose. Sugars also include high fructose corn syrup solids, invert sugar, sugar alcohols, including sorbitol, and mixtures thereof. Artificial sweeteners are also included in the term sweetener.

As used herein, the term "mixing in a dry state" means that dry or liquid ingredients are blended without adding any water, steam or other water containing solvent. The mixing should make as homogeneous a blend as possible.

Mineral and Vitamin Component

The present invention involves stable dry mixes which include vitamin C to enhance the body's uptake of nutritionally supplemental amounts of iron compounds in humans and lower animals. These dry beverage mixes can be supplemented with vitamin A or $\beta$-carotene, vitamin E, vitamin D and the B vitamins, e.g., riboflavin, niacin, pantothenic acid, folic acid and thiamine.

In beverage mixes of the type disclosed herein, the nutritionally supplemental amount for iron or minerals will generally comprise more than 3% of the RDA and preferably 10%-100% RDA, most preferably 10%-30% of the RDA, per unit portion of the finished beverage For vitamins, the nutritionally supplemental amount will comprise more than 10%, preferably about 20% to about 100% and, most preferably, from about 50% to about 150% RDA in the finished beverage. Of course, it is recognized that the preferred daily intake of any mineral or vitamin may vary with the user.

Persons suffering with anemia may require an increased intake of iron. Persons suffering vitamin deficiencies or who have poor diets will require more vitamins A, C and riboflavin, particularly growing children in developing countries, e.g., South and Central America Such matters are familiar to physicians and nutritional experts, and usage of the compositions of the present invention may be adjusted accordingly.

In general, the RDA for vitamin C is 60 mg. The RDA for vitamin A as retinal is 1 mg. and as $\beta$-carotene the RDA is 6 mg. The RDA of riboflavin is 1.7 mg. The RDA for niacin is 20 mg, and for the other B vitamins are: thiamine, 1.5 mg.; $B_6$, 2.0 mg; folic acid, 0.4 mg; and $B_{12}$, 6 $\mu$g. and for vitamin E is 30 IU (International Unit).

In general, the RDA for iron ranges from 10 mg per 6 Kg to 18 mg per 54-58 Kg female, depending somewhat on age. Typically, foods and beverages are supplemented with from about 10-25% RDA iron (based per serving) to account for iron which is available from other dietary sources (assuming a reasonably balanced diet). In general, the RDA (calcium) will range from 360 mg per 6 Kg for infants to 1200 mg/54-58 Kg female, depending somewhat on age. Moreover, it can be difficult to supplement beverages with more than 20-30% RDA of calcium (based per serving) without encountering precipitation and/or organoleptic problems However, this level of supplementation is equivalent to cow's milk in calcium value, and is therefore acceptable. Of course, if iron toxicity and organoleptic quality are not deemed important considerations in individual circumstances, more of the supplements herein can be used.

Any commercially available source of vitamin C or ascorbic acid can be used herein. Encapsulated vitamin C and edible salts of ascorbic acid can also be used. Preferably from about 25% to about 300% of the RDA is used in the beverages (15 mg/240 gm of finished beverage or 0.006% to about 80 mg/240 gm of finished beverage or 0.075%). Most preferably, the amount of vitamin C used is from about 25% to about 150% of the RDA.

Commercially available vitamin A is used herein. From 10% RDA to 50% RDA is preferably added to the dry mix.

Encapsulated $\beta$-carotene can be substituted for the vitamin A. One encapsulation material is dextrin. Similar encapsulation materials can also be used (Roche Vitamins and Fine Chemicals, Nutley, N.J. is a source of encapsulated $\beta$-carotene (1% powder)). A level of from about 0.0006% or about 1.5 mg/240 gm beverage provides at least 25% of the RDA of vitamin A as $\beta$-carotene. Preferably from about 0.006% to about 0.007% (25% to about 300% RDA) and, most preferably, from about 0.018% to about 0.036% $\beta$-carotene (75% to 150% RDA) is used in the dry beverage mix.

Any commercially available source of riboflavin can be used. Preferably from about 20% to about 200% in the beverage (0.34 mg/240 gm to 3.4 mg/240 gm of finished beverages).

Other vitamins which can be added to the dry beverage mix include vitamin $B_6$, niacin, pantothenic acid, folic acid, vitamin D, vitamin E and vitamin $B_{12}$. Other vitamins can also be used.

The dry mix is diluted by a factor of about 1 to 10 to make the beverage which is consumed. This factor must be considered when preparing the mix since it is about 10 times more concentrated than the final beverage.

Other minerals which can be added include calcium, zinc and copper. Any soluble salt of these minerals can be used, for example, zinc chloride, zinc sulfate and copper sulfate. A preferred calcium source is calcium organic acid complexes. The preparation of the preferred calcium source used herein, calcium organic complexes, and preferably, "calcium citrate-malate", is described in U.S. Pat. No. 4,786,510 and U.S. Pat. No. 4,786,518 issued to Nakel et al (1988) and U.S. Pat. No. 4,722,847 issued to Heckert (1988); incorporated herein by reference. A nutritionally supplemental amount of these minerals is used. However, the particular salt used and the level will depend upon their interaction with the iron and other mix ingredients.

Ferrous iron is better utilized by the body than ferric iron. Importantly, the highly bioavailable, common ferrous salts e.g., ferrous sulfate, ferrous gluconate, ferrous fumarate, cause off-flavors and undesirable color in foods high in moisture and fat. Ferrous sulfate is unacceptable for use in dry beverage mixes and other dried foods like cereals. Ferric or ferrous iron can also catalyze the oxidization of vitamin C and thus degrade vitamin C in the beverage mixes. The product of this invention is low in fat and moisture (less than 5%) which helps to delay these reactions, but ferrous sulfate is still not useful. The preferred ferrous salts are ferrous fumarate and ferrous succinate, which, in combination with the other ingredients in the mix, are highly bioavailable. The bioavailability is equal to ferrous sulfate with no undesirable side reactions. Any commercially available source of these salts can be used herein.

Also useful herein are the iron-sugar-carboxylate complexes. In the iron-sugar-carboxylate complexes, the carboxylate provides the counterion for the ferrous (preferred) or ferric iron. While not intending to be limited by theory, it is believed that the acceptable taste of these iron complexes is due to the relatively large sizes of the sugar moiety and carboxylate counterion, which mask the usual "well-water" and/or brackish flavor of some iron supplements.

The overall synthesis of the preferred iron-sugar-carboxylate complexes used in the practice of this invention involves (a) forming a calcium-sugar moiety in aqueous media, for example, by reacting calcium hydroxide with a sugar;

(b) reacting an iron source, such as ferrous ammonium sulfate, with the calcium-sugar moiety in aqueous media to provide an iron-sugar moiety; and (c) neutralizing the reaction system with a carboxylic acid, for example, malic acid, to provide the desired iron-sugar complex.

The preferred iron II-sucrate-malate complex prepared in this manner is essentially equivalent to ferrous sulfate in iron bioavailability (measured as % change in hemoglobin of anemic test animals over the range of 0-9 ppm Fe), and, most importantly, is organoleptically acceptable in beverages.

The "sugars" which can be employed in the preparation of iron compounds preferred for use in the practice of this invention include any of the ingestible saccharidic materials, and mixtures thereof, well-known in the culinary arts. For example, glucose, sucrose and fructose can conveniently be employed, with sucrose and fructose being the more preferred. However, other saccharidic materials can be used, for example mannose, galactose, lactose, maltose, and the like.

The "carboxylate counterion" used in the preparation of the preferred iron-sugar complexes herein can be any ingestible carboxylate species. However, some judgment must be made with regard to flavor contribution. For example, citrate, malate and ascorbate yield ingestible complexes whose flavors are judged to be quite acceptable. Tartaric acid is acceptable, as is lactic acid.

As noted above, iron bioavailability is normally somewhat impaired by the conjoint administration of calcium, but this impairment is overcome by use of the organic acids (citric and malic) and vitamin C in the vitamin and mineral supplemented beverage mixes of this invention.

Milk Solids

The dry beverage mix can contain dried milk solids. While the dry beverage mix can be made without milk solids, the preferred level is up to 25% of the mix. If no milk solids are used, the mix is most preferably prepared using milk. Most preferably the mix contains from 5% to 20% milk solids.

Milk solids are prepared by drying milk to produce a mixture of the proteins, minerals, whey and other components of milk in a dry form. These solids are preferably non-fat milk solids, i.e. the solids derived from milk which has had the fat removed. Any commercial source of non-fat or other milk solids can be used.

Flow aids and other starches can be added to the milk solids to keep the powder from caking. Other desiccants can also be used. Protein supplements can be added to the milk solids to increase the protein content of the milk and the final beverage product The fat content of the milk solids must be counted in the total fat of the dry mix.

Cocoa Component

The cocoa used in this invention is natural or "Dutched" chocolate, or washed or fermented cocoa, from which a substantial portion of the fat or cocoa butter has been expressed or removed by solvent extraction, by pressing, or by other means. Cocoa suitable for use in the composition of this invention may contain from 1% to 20% fatty constituents.

Dutched chocolate is prepared by treating cocoa nibs with alkaline material such as potassium carbonate in a manner well known in the art. Generally, it tends to have a darker color and also can be more flavorful than natural cocoas.

Fermented cocoa powder can also be used. This cocoa is prepared by fermenting green cocoa beans before roasting and milling. The fermentation is usually conducted by soaking the green beans in water for a week and then drying.

Chocolate can be used in practicing the process of this invention and it is intended, therefore, that chocolate, as described above, is to be encompassed by the term "cocoa" When chocolate is used, it should be in a finely divided form It may be necessary to reduce the amount of fat in the chocolate for incorporation into the dry beverage mix so that the total fat of the mix does not exceed 5%.

The cocoa should be heat treated to sterilize it. Heating at about 110° C. for 1.5 hours to 3 hours is sufficient to kill bacteria, yeasts and molds. Any conventional pasteurization oven or pasteurization equipment for solids can be used.

Flavor Component

The flavor component of the present invention contains flavors selected from natural flavors, botanical flavors and mixtures thereof The term "fruit flavors" refers to those flavors derived from the edible reproductive part of a seed plant, especially one having a sweet pulp associated with the seed. Also included within the term "fruit flavor" are synthetically prepared flavors made to simulate fruit flavors derived from natural sources.

The term "botanical flavor" refers to flavors derived from parts of a plant other than the fruit; i.e. derived from bean, nuts, bark, roots and leaves. Also included within the term "botanical flavor" are synthetically prepared flavors made to simulate botanical flavors derived from natural sources. Examples of such flavors include cocoa, chocolate, vanilla, coffee, cola, tea, and the like. Botanical flavors can be derived from natural sources such as essential oils and extracts, or can be synthetically prepared.

The particular amount of the flavor component effective for imparting flavor characteristics to the beverage mixes of the present invention ("flavor enhancing") can depend upon the flavor(s) selected, the flavor impression desired, and the form of the flavor component. The flavor component can comprise at least 0.05% by weight of the beverage composition.

Flavors which complement the chocolate flavor can be used. These would include mint, coffee, toffee, creamy, cinnamon and nut flavors.

The beverage mix can be flavored with fruit or other botanical flavors, e.g., vanilla, strawberry, cherry, pineapple, banana, and mixtures thereof.

For chocolate or cocoa, the amount of flavor added to the dry mix will be from about 0.05% to about 20%. Lower amounts of artificial or synthetic chocolate flavors are used than for cocoa itself For cocoa, the amount is preferably from about 15% to about 20%. For the other flavors, the amount added to the dry mix will be from about 0% to about 10%. The amount of flavor added is within the skill of one in the art and depends on the flavor intensity desired.

Sweetener Component

The sweetener composition is usually a monosaccharide or a disaccharide. These include sucrose, fructose, dextrose, maltose and lactose. Other carbohydrates can be used if less sweetness is desired. Mixtures of these sugars can be used.

In addition to sugar of the present invention can contain other natural or artificial sweeteners. Other suitable sweeteners include saccharin, cyclamates, acetosulfam, L-aspartyl-L-phenylalanine lower alkyl ester sweeteners (e.g. aspartame), L-aspartyl-D-alanine amides disclosed in U.S. Pat. No. 4,411,925 to Brennan et al., issued Oct. 23, 1983, L-aspartyl-D-serine amides disclosed in U.S. Pat. No. 4,399,163 at Brennan et al., issued Aug. 16, 1983, L-aspartyl-L-1-hydroxymethylalkaneamide sweeteners disclosed in U.S. Pat. No. 4,338,346 to Brand, issued Dec. 21, 1982, L-aspartyl-1-hydroxyethylakaneamide sweeteners disclosed in U.S. Pat. No. 4,423,029 to Rizzi, issued Dec. 27, 1983, L-aspartyl-D-phenylglycine ester and amide sweeteners disclosed in European Patent Application 168,112 to J. M. Janusz, published Jan. 15, 1986, and the like. A particularly preferred sweetener is aspartame.

The amount of the sweetener effective in the beverage mixes of the invention depends upon the particular sweetener used and the sweetness intensity desired For noncaloric sweeteners, this amount varies depending upon the sweetness intensity of the particular sweetener. For sugar (i.e., sucrose), this amount can be from 10% to 85% (typically from 55% to 70%) by weight In determining the amount of sugar for beverage mixes of the present invention, any sugar or other sweetener present in the flavor component is also included. Low-calorie sweetener combinations containing a noncaloric sweetener such as aspartame and a sugar, such as corn syrup solids, or sugar alcohols can also be used in beverage mixes. In general, the amount of sweetener will be from about 0.5% to about 85%.

Total Water and Fat Levels

As noted above, the ferrous ion from the highly bioavailable iron sources can (a) catalyze the degradation of vitamin C, (b) oxidize to form undesirable colored ferric oxide, and (c) react with polyphenols to cause unacceptable colored product These reactions are accelerated by water. Therefore, it is essential to keep the total water level below 5%. The total fat level should also be kept below 5% so that the oxidation is not pronounced, because ferrous ion can cause rancidity by oxidizing the lipids.

Preferably the water content is below 3% and most preferably from about 2.0% to 3.0%. Preferably the fat content is below 4% and most preferably from about 2.5% to about 3.5%

Other Beverage Ingredients

Other minor ingredients are frequently included in beverages. Such ingredients include preservatives such as benzoic acid and salts thereof, sulfur dioxide, butylated hydroxyanisole, butylated hydroxytoluene, etc. Also, typically included are colors derived either from natural sources or synthetically prepared.

Salt, e.g. sodium chloride, and other flavor enhancers can be used to improve the flavor of the beverage.

Emulsifiers can also be included in the beverage mix. These materials help to disperse the milk solids and the cocoa in the water or milk which is used to prepare the final beverage. Any food grade emulsifier can be used Lecithin is a preferred emulsifier. Other edible emulsifiers include mono and di-glycerides of long chain fatty acids, preferably saturated fatty acids, and most preferably, stearic and palmitic acid mono- and diglycerides. Propylene glycol esters are also useful in the beverage mixes.

Method for Preparing Beverage Mixes

The preferred overall method for preparing the dry compositions herein involves separately preparing mixtures of the dry ingredients and the emulsifier (which may be liquid). As noted earlier, it is essential to the preparation of a stable dry beverage mix that the iron and vitamin C not be combined wet or agglomerated with water or steam. The ingredients should be as anhydrous as possible and mixed in a dry state.

While all of the ingredients can be mixed together, it has been found that the preparation of three to five separate mixtures are best if emulsifiers and other vitamin supplements are used. These mixtures are (1) vitamins other than vitamin C and the iron source; (2) vitamin C and iron vitamins mixture (1); and (3) the cocoa and milk solids. These premixes are blended into a homogeneous dry beverage composition with the sweetener.

Any conventional equipment for handling and mixing powders can be used. Preferably the equipment will be capable of breaking up lumps and thoroughly mixing the powders. A micropulverizer can be used. The dry ingredients should be sifted if there are lumps which will not be broken up during the blending.

When emulsifiers are used, the emulsifiers should be melted and blended with the other ingredients as a liquid. Preferably the oil soluble vitamins, A and E, are dissolved in the lecithin or emulsifier which is then blended with the other materials.

The preferred premixes have the following compositions:

(1) Iron Mixture (with optional ingredients)
   (a) 15%–35% ferrous fumarate or ferrous succinate or other iron sugar carboxylate;
   (b) 0% to 40% salt; preferably, 30 to 40% salt;
   (c) 20% to 30% tribasic calcium phosphate; (calcium source)
   (d) 0% to 0.5% riboflavin
   (e) 0% to 2% calcium pantothenate
   (f) 0% to 1.0% thiamine mononitrate
   (g) 0% to 15% niacinamide
(2) Iron and Vitamin C Mixture
   (a) from 10% to 25% of Iron Mixture (1)
   (b) from 0% to 35% salt
   (c) from 25% to 40% dry milk solids
   (d) from 15% to 25% Ascorbic acid or Vitamin C
(3) Color and Flavor Mixture
   (a) 0% to 10% color, preferably chocolate
   (b) 1% to 45% flavor
   (c) 25% to 60% dry milk solids
(4) Cocoa mixture
   (a) from 50% to 75% cocoa powder, preferably with about 10% to 15% fat content
   (b) 15% to 25% dry milk solids
   (c) 1% to 5% of the Iron and Vitamin C mixture (2)
   (d) 1% to 5% of the Color and Flavor Mixture (3)
(5) Lecithin and Fat Soluble Vitamin Mixture
   (a) 99.6% to 100% Lecithin or emulsifier
   (b) 0% to 0.2% antioxidant, preferably butylated hydroxytoluene
   (c) 0% to 0.1% vitamin A, 1000M units/gm
   (d) 0% to 0.1% vitamin D, 1000M units/gm
Final Product:
   (a) 20% to 25% of Mix (4)
   (b) 5% to 10% milk solids
   (c) 0% to 1% mix (5)
   (d) 50% to 60% sucrose Typical ingredient levels in a dry beverage chocolate drink product are:

| Ingredient | Amount |
| --- | --- |
| Iron source[1] | 0.01% to 2% |
| Milk solids | 10% to 20% |
| salt | 0.1% to 0.6% |
| sucrose or sugar | 60% to 75% |
| lecithin | 0.5% to 1.5% |
| cocoa | 10% to 20% |
| water | 1% to 4% |
| fat | 1% to 4% |

[1] ferrous fumarate, ferrous succinate or iron sugar carboxylate

Packaging

In order to maintain the stability of the iron salts and to keep the vitamin C from oxidizing, the beverage mix should be packaged in a moisture barrier package. Foil lined packages or metal cans are preferred. Plastic or laminated packages are also useful. The mix can be packaged in an atmosphere of nitrogen or carbon dioxide or other inert common non-oxidizing gaseous mixtures. This is within the skill of one in the art to pack the beverage mixes in this manner. Preferably, the beverage mixes are packaged in foil or other oxygen and water impermeable package.

The following example illustrates beverage compositions of the type provided by the practice of this invention, but is not intended to be limiting thereof

Example I

A chocolate powder mix is prepared as follows:

| Ingredient | Amount (percent) |
| --- | --- |
| Granular Sucrose | 66.88 |
| Non-fat Dry Milk | 15.00 |
| Sodium Chloride | 0.4 |
| Fermented Cocoa Powder, 14% fat | 16.0 |
| Lecithin | 1.0 |
| Colors | 0.07 |
| Butylated Hydroxytoluene (BHT) | 0.0003 |
| Riboflavin | 0.0007 |
| Ascorbic Acid | 0.21 |
| Ferrous Fumarate | 0.06 |
| Calcium Phosphate | 0.05 |
| Artificial Chocolate Flavor | 0.3 |
| Niacinamide | 0.023 |
| Vitamin A & D (liquid mix) | 0.003 |
| Calcium pantothenate | 0.003 |
| Thiamine Mononitrate | 0.001 |

The lecithin is heated to 45° C. to melt it and the liquid vitamins A and D mix added to it.

The cocoa is sterilized at 160° C. in a pasteurizing oven for 2 hours.

A first premix is prepared by dry mixing the ferrous fumarate, calcium phosphate, niacinamide, thiamine, riboflavin, calcium pantothenate and about one-half of the sodium chloride. This premix will be 0.2% of the final product.

This iron premix is added to a dry mix of the remaining sodium chloride, vitamin C, and part of the non-fat dry milk. This mixture will be 1.0% of the product. The colors and flavor are premixed with part of the non-fat dry milk solids (0.8% of final product). Cocoa powder, the remaining milk solids, vitamin and iron mix and the color/flavor mix are mixed together (22.88% of final product).

The BHT, lecithin and liquid vitamin A and D are mixed together for one hour at 50° to 60° C. All of these mixes are then added to sucrose and blended to make a homogeneous dry mix.

To make a beverage, 25 gm of this product is dissolved in 240 ml of milk.

This beverage mix provides 38% RDA for iron, 11% RDA for calcium, 97% RDA for vitamin C, and 28% RDA for vitamin A.

Example II

A product is made according to Example I except that the ferrous fumarate is replaced by ferric pyrophosphate and the vitamin C is deleted. Ferric pyrophosphate is commonly used to fortify foods. As can be seen from the data below, the ferrous fumarate plus vitamin C mix (Example I) is six times more bioavailable than fortified with the ferric pyrophosphate product.

The iron bioavailability of the chocolate powder prepared according to Example I along with other test samples was determined by using hemoglobin repletion procedure. Rats were first made anemic by feeding an iron-low diet. Subsequently, these iron deficient rats were fed the test samples. The hemoglobin gain from the iron source in question was compared to that obtained from ferrous sulfate, the accepted standard in iron bioavailability studies. Such a result was obtained without adversely affecting the taste or color of the product.

| Bioavailability of Iron as Assayed by Hemoglobin Repletion Method | |
| --- | --- |
| Treatments | Hemoglobin Gains (g/dl ± SEM) |
| 1. FeSO4 | 3.1 ± 0.5 |
| 2. Example I | 3.6 ± 0.7 |
| 3. Example II | 0.60 ± 0.5 |

An acceptance test of these products was conducted with mothers and their children as a single product placement panel

| Chocolate Powder Prototypes Extended Taste Preference Fortified | | |
| --- | --- | --- |
| | Ferrous Fumarate (Example I) | Ferric Pyrophosphate (Example II) |
| Children | | |
| Overall Rating | 76 | 74 |
| Color Rating | 70 | 63 |
| Mothers | | |
| Overall Rating | 70 | 70 |

This shows that the taste of Example I is equal to Example II, which is fortified with ferric pyrophosphate which does not have the oxidation problems related to other ferrous sources.

Example III

Preparation of Iron II Sucrate-Malate

Sucrose (85.5 g) is dissolved in water (299.8 g), making sure that dissolution is complete. Calcium hydroxide (18.5 g) is then added, and the mixture is stirred for 5 minutes. If any clouding is observed, the resulting solution is filtered through a glass filter.

To the resulting calcium-sucrate solution is added ferrous ammonium sulfate (24.5 g), and the solution is covered air-tight (e.g., SARAN WRAP). The green color indicates the iron is in the desired II oxidation state.

To the above solution is added malic acid (33.5 g) in 3 batches, to pH 3-4. The precipitate is filtered through standard filter paper, but the filter cake comprising calcium sulfate is not rinsed. The resulting solution comprises the iron sucrate-malate used in the practice of this invention. The solution can be used per se, or can be freeze-dried to provide the iron sucrate-malate in powder form.

In an alternate mode, KOH can be substituted for Ca(OH)$_2$ in the first step, but sulfate ion will be left in the final product.

Preparation of Calcium-Citrate-Malate

A calcium-citrate-malate solution is prepared by dissolving 2 parts sucrose and then 0.1 part citric and 0.28 part malic acids in 28.19 parts water. Calcium hydroxide (0.22 part) is added and the mixture is agitated. This solution can be used directly to prepare beverages, or can be freeze-dried to use in solid form.

Chocolate Powder Compositions

The following beverage flavor compositions (1-3) are substituted for the cocoa in Example 1. Iron II sucrate malate is used to replace the ferrous fumarate and calcium citrate malate is used to replace the calcium phosphate.

(1) mixed flavor comprising pineapple and orange;
(2) banana flavor; and
(3) strawberry.

What is claimed is:

1. A nutritional vitamin and mineral supplemented dry beverage mix, comprising a mixture of:
   (a) from 5% to about 25% milk solids;
   (b) from about 0.05% to about 20% flavor;
   (c) from about 10% to about 100% RDA of an iron source selected from iron sugar complexes, wherein the counterion is selected from malate, citrate, tartrate, ascorbate, or mixtures thereof;
   (d) from about 10% to about 150% RDA of vitamin C; and
   (e) from about 0.5% to about 85% sweetener;
   wherein, said composition contains no more than 5% total water and no more than 5% total fat.

2. A beverage mix according to claim 1 wherein said iron source is ferrous fumarate.

3. A beverage mix according to claim 2 wherein said flavor is chocolate or cocoa.

4. A beverage mix according to claim 3 which comprises an effective amount of an artificial sweetener.

5. A beverage mix according to claim 4 wherein the mix further comprises an effective amount of a sugar alcohol selected from the group consisting of sorbitol, mannitol, and mixtures thereof.

6. A beverage mix according to claim 3 which contains fermented or washed cocoa.

7. A beverage mix according to claim 3 which contains no more than 3.5% water and no more than 3% fat.

8. A beverage mix according to claim 3 which comprises from about 0.05% to about 10% of a natural or botanical flavor or mixtures thereof.

9. A beverage mix according to claim 3 which comprises from about 15% to about 75% sweetener, and wherein said sweetener is sugar.

10. A beverage mix according to claim 9 wherein the sugar is selected from the group consisting of sucrose, fructose, glucose, high fructose corn solids and invert sugar and mixtures thereof.

11. A beverage mix according to claim 9 which comprises at least about 40% sugar.

12. A composition according to claim 2 wherein the flavor is selected from cherry, pineapple, banana or banana puree, apricot, apple and mixtures thereof.

13. A beverage mix according to claim 1 wherein the iron-sugar complex is iron sucrate-malate, iron fructate-malate, or mixtures thereof.

14. A beverage mix according to claim 1 wherein said flavor is chocolate.

15. A beverage mix according to claim 1 which further contains from about 10% to about 150% of the RDA of a vitamin selected from the group consisting of vitamin A, vitamin E, vitamin D and riboflavin, niacin, pantothenic acid, folic acid, thiamine and mixtures thereof.

16. A stable nutritional vitamin and mineral supplemented dry beverage mix, comprising a mixture of:
   (a) from 0% to about 25% milk solids;
   (b) from about 0.05% to about 20% flavor;
   (c) from about 10% to about 1001% RDA of an iron source selected from highly bioavailable iron sources, such as ferrous fumarate, ferrous succinate or iron sugar complex;
   (d) from about 10% to about 150% RDA of vitamin C;
   (e) from about 0.5% to about 85% sweetener;
   (f) β-carotene encapsulated in dextrin, gum acacia, or mixtures thereof, and wherein, said composition contains no more than 5% total water and no more than 5% total fat.

17. A nutritional vitamin and mineral supplemented dry beverage mix, comprising a mixture of:
(a) from 0% to about 25% milk solids;
(b) from about 0.05% to about 20% chocolate or cocoa flavor;
(c) from about 10% to about 100% RDA of ferrous fumarate;
(d) from about 10% to about 150% RDA of vitamin C;
(e) from about 0.5% to about 85% of a sweetener; and
(f) a nutritionally supplemental amount of calcium-citrate-malate and, wherein, said composition contains no more than 5% total water and no more than 5% total fat.

18. A beverage mix according to claim 17 which further contains from about 10% to about 150% of the RDA of a vitamin selected from the group consisting of vitamin A, vitamin E, vitamin D and riboflavin, niacin, pantothenic acid, folic acid, thiamine and mixtures thereof.

19. A beverage mix according to claim 17 which contains fermented or washed cocoa.

20. A beverage mix according to claim 17 which contains no more than 3.5% water and no more than 3% fat.

21. A process for preparing a nutritional vitamin and mineral supplemented dry beverage mix, comprising mixing a dry state:
(a) from about 0% to about 25% milk solids;
(b) from about 0.05% to about 20% flavor;
(c) from about 10% to about 100% RDA of an iron source selected from iron sugar complexes wherein the counterion is selected from malate, citrate, tartrate, ascorbate, or mixtures thereof;
(d) from about 10% to about 300% RDA of vitamin C; and
(e) from about 0.5% to about 75% sweetener selected from the group of fructose, glucose, sucrose and mixtures thereof; and wherein said mix contains no more than 5% total water and no more than 25% total fat.

22. A process according to claim 21 wherein said sweetener comprises an effective amount of an artificial sweetener and wherein said flavor is chocolate or cocoa.

23. A process according to claim 21 which contains a nutritionally supplemental amount of calciumcitrate-malate.

* * * * *

UNITED STATES PATENT AND TRADEMARK OFFICE
CERTIFICATE OF CORRECTION

PATENT NO.   : 5,002,779
DATED        : March 26, 1991
INVENTOR(S)  : H. Mehansho et al.

It is certified that error appears in the above-identified patent and that said Letters Patent is hereby corrected as shown below:

In column 14, line 6, after "from" insert --ferrous fumarate and--

Signed and Sealed this

Eighth Day of December, 1992

Attest:

DOUGLAS B. COMER

Attesting Officer        Acting Commissioner of Patents and Trademarks